US009068648B2

(12) United States Patent
Moehlmann

(10) Patent No.: US 9,068,648 B2
(45) Date of Patent: Jun. 30, 2015

(54) AUTOMATED TRANSMISSION AND METHOD FOR OPERATING AN AUTOMATED TRANSMISSION

(75) Inventor: Reinhard Moehlmann, Odenthal (DE)

(73) Assignee: Getrag Ford Transmissions GmbH, Cologne (DE)

( * ) Notice: Subject to any disclaimer, the term of this patent is extended or adjusted under 35 U.S.C. 154(b) by 603 days.

(21) Appl. No.: 13/378,315

(22) PCT Filed: Jun. 28, 2010

(86) PCT No.: PCT/EP2010/059158
§ 371 (c)(1),
(2), (4) Date: Feb. 29, 2012

(87) PCT Pub. No.: WO2010/149797
PCT Pub. Date: Dec. 29, 2010

(65) Prior Publication Data
US 2012/0144940 A1    Jun. 14, 2012

(30) Foreign Application Priority Data
Jun. 26, 2009    (DE) .......................... 10 2009 030 749

(51) Int. Cl.
*F16H 3/08*        (2006.01)
*F16H 61/00*       (2006.01)
(Continued)

(52) U.S. Cl.
CPC ....... *F16H 61/0021* (2013.01); *Y10T 74/19251* (2015.01); *Y10T 74/19233* (2015.01); *F16H 61/0206* (2013.01); *F16H 61/688* (2013.01)

(58) Field of Classification Search
CPC    F16H 61/0021; F16H 61/688; F16H 61/0206
USPC .............. 74/640, 730.1, 731.1, 732.1, 733.1; 475/127; 192/3.57
See application file for complete search history.

(56) References Cited

U.S. PATENT DOCUMENTS 3,326,066 A * 6/1967 Murphy ..................... 74/733.1
3,363,515 A * 1/1968 Fuell et al. ................. 91/217
(Continued)

FOREIGN PATENT DOCUMENTS

DE    102006038446    2/2008
EP    1589262         10/2005
(Continued)

OTHER PUBLICATIONS

English Translation of the Written Opinion issued by the EPO in the underlying PCT application PCT/EP2010/059158.

*Primary Examiner* — William Kelleher
*Assistant Examiner* — Valentin Craciun
(74) *Attorney, Agent, or Firm* — Schlee IP International, P.C.; Alexander R. Schlee

(57) ABSTRACT

An automated transmission comprises a hydraulic control device and one or more hydraulically actuated gear units. The hydraulic control device comprises a control unit for setting actuating pressures on the gear units; a base pressure control valve for adjusting a hydraulic base pressure of the hydraulic control device; and a device for controlling the base pressure control valve dependent on the actuating pressures. The automated transmission further comprises a device for switching through an actuating hydraulic pressure to the base pressure control valve. A method comprises the method steps of adjusting a hydraulic base pressure at the hydraulic control device; adjusting actuating pressures for actuating one or more transmission units; switching through one of the actuating pressures to the base pressure control valve; and adjusting the hydraulic base pressure by one of the actuating pressures.

18 Claims, 6 Drawing Sheets

(51) Int. Cl.
*F16H 61/02* (2006.01)
*F16H 61/688* (2006.01)

(56) References Cited

U.S. PATENT DOCUMENTS

| | | | | |
|---|---|---|---|---|
| 3,570,636 | A | * | 3/1971 | Franz et al. ................. 192/3.57 |
| 3,979,655 | A | * | 9/1976 | Rutshtein et al. ............. 318/609 |
| 4,693,347 | A | * | 9/1987 | Nishikawa et al. ............ 192/3.3 |
| 4,966,066 | A | * | 10/1990 | Kauss et al. ..................... 91/516 |
| 5,842,953 | A | * | 12/1998 | Yasue et al. ................... 477/174 |
| 6,471,613 | B1 | * | 10/2002 | Botosan et al. ............... 475/120 |
| 6,802,792 | B2 | * | 10/2004 | Fujimine et al. ............. 475/116 |
| 6,835,151 | B2 | * | 12/2004 | Fujimine et al. ............. 475/116 |
| 7,055,326 | B1 | * | 6/2006 | Kalina ............................ 60/649 |
| 7,351,175 | B2 | * | 4/2008 | Kraxner et al. ............... 475/127 |
| 7,725,222 | B2 | * | 5/2010 | Endo et al. ...................... 701/22 |
| 7,766,139 | B2 | * | 8/2010 | De Maziere et al. ......... 192/3.58 |
| 7,931,551 | B2 | * | 4/2011 | Katou et al. ..................... 474/28 |
| 8,506,454 | B2 | * | 8/2013 | Shimizu et al. ............... 477/156 |
| 2004/0063534 | A1 | * | 4/2004 | Fujimine et al. ............. 475/116 |
| 2004/0067810 | A1 | * | 4/2004 | Fujimine et al. ............. 475/127 |
| 2006/0046897 | A1 | * | 3/2006 | Mohlmann et al. ........... 477/143 |
| 2008/0035443 | A1 | * | 2/2008 | De Maziere et al. ........ 192/3.57 |
| 2011/0073196 | A1 | * | 3/2011 | Ishikawa et al. ........... 137/487.5 |
| 2011/0295472 | A1 | * | 12/2011 | Webert et al. ................... 701/58 |

FOREIGN PATENT DOCUMENTS

| | | |
|---|---|---|
| EP | 1635091 | 3/2006 |
| EP | 1674765 | 6/2006 |
| EP | 1881222 | 1/2008 |
| WO | WO 2013061129 A1 * | 10/2012 |

* cited by examiner

AUTOMATED TRANSMISSION AND METHOD FOR OPERATING AN AUTOMATED TRANSMISSION

CROSS-REFERENCE TO RELATED APPLICATIONS

This application is a national phase of the International Patent Application PCT/EP2010/059158 filed on Jun. 28, 2010 and published under the publication number WO 2010/149797, claiming the priority of the German patent application 10 2009 030 749.4 that was filed on Jun. 26, 2009. The content of both aforementioned prior applications is herewith incorporated by reference.

BACKGROUND OF THE INVENTION

The invention relates to an automated transmission comprising a hydraulic control device and comprising one or more hydraulic drive units. Furthermore, the invention relates to a method for operating an automated transmission, wherein by a base pressure control valve, a hydraulic pressure for a hydraulic control device is controlled, and by suitable pressure control valves actuating pressures for actuating the gear units are controlled.

From the published patent application EP 1 635 091 A1 an automated transmission in the form of a dual clutch transmission is known, comprising a first clutch for a first gear train, a second clutch for a second gear train, and a switching system for engaging and disengaging gears in the two partial transmission of the dual clutch transmission, wherein the clutches and the switching system represent the hydraulically actuated gear units. The hydraulic control device of the dual clutch transmission comprises a control unit with control valves for actuating the two clutches and the switching system, the hydraulic control device providing a controllable pressure and/or an adjustable volume flow for the clutches and/or for the switching system. In addition, the hydraulic control device has a switching device that is arranged between the control unit and the clutches or between the control unit and the switching system, the switching device allowing to switch the respective variable pressure or volume flow to the clutches or to the switching system. Although this hydraulic control device is a good compromise between functionality and design complexity, there is a permanent desire to further decrease the design complexity and therefore to provide control devices and dual clutch transmissions at lower costs.

Providing the base pressure and the actuating pressures for clutches and shift system requires energy and therefore reduces the efficiency of the dual clutch transmission.

SUMMARY OF THE INVENTION

A first object of the invention is therefore to provide a dual clutch transmission having a simple design and high energy efficiency. In addition, a second object is to provide an efficient method of operating a dual clutch transmission.

The first object is achieved by an automated transmission comprising: a hydraulic control device; and one or more hydraulically actuated gear units, wherein the hydraulic control device comprises: a control unit for setting actuating pressures on the gear units; a base pressure control valve for adjusting a hydraulic base pressure of the hydraulic control device; and a device for controlling the base pressure control valve dependent on the actuating pressures; and wherein the automated transmission further comprises a device for switching through an actuating hydraulic pressure to the base pressure control valve. Preferably, the base pressure is adjusted exclusively based on the actuating pressures, in particular by the base pressure control valve.

DETAILED DESCRIPTION OF THE INVENTION

Since the hydraulic control apparatus according to the invention comprises a hydraulic device for controlling the base pressure control valve dependent on an actuating pressure including the ability to switch through one of the actuating pressures, this simplifies the structure, so that costs can be saved in the manufacturing and implementation of the hydraulic control device. Ideally, there is no need for a separate and previously common pilot valve for controlling such a base pressure control valve. This alone saves already several Euros in connection with the implementation of the base pressure control valve of the hydraulic control device, in particular in a dual clutch transmission. Moreover, controlling the base pressure dependent on an actuating pressure allows reducing the energy that is required for providing the base pressure.

By the term "base pressure control valve" in this case a main pressure control valve of a hydraulic control device is described by which main pressure control valve a hydraulic base pressure can be adjusted within a hydraulic line system of the hydraulic control device.

The automated transmission may be a dual clutch transmission comprising a first clutch for connecting and disconnecting a first partial transmission to or from a powertrain, a second clutch for connecting and disconnecting a second partial transmission to or from the powertrain, and a switching system for shifting gears in the first and second partial transmission. In the alternative, the automated transmission may likewise be a continuously variable transmission or a gear shift transmission comprising only one clutch.

The hydraulic base pressure can ideally be adjusted so that it is by an amount delta (for instance 0 to 5 bar, preferably 0.5 to 2 bar) higher than the highest temporarily required actuating pressure, advantageously allowing to compensate for pressure losses within the hydraulic control device. Starting from this hydraulic base pressure suitable pressure control valves at the hydraulic control device can reliably adjust the required actuating pressures.

In addition, the basic hydraulic pressure is preferably always set to a higher value than zero, even if the highest temporarily required actuating pressure becomes at any given point in time close to zero, so as to always ensure a hydraulic minimum supply for proper cooling and/or lubrication within the hydraulic control device.

The term "controlling the base pressure dependent on an actuating pressure" describes the present case that the base pressure control valve, and thus indirectly the base pressure in the hydraulic control device is controlled depending on any of the required or temporarily set actuating pressures that is determined by control unit. In other words, the hydraulic base pressure can be determined depending on the hydraulic output signals that are provided by the pressure control valves of the control unit. In particular, if temporarily only a lower actuating pressure is required to properly operate the dual clutch transmission in one of its operating states, the base pressure in the hydraulic control device can at least temporarily be adjusted to this lower actuating pressure. Or briefly: the base pressure can be adjusted by the hydraulic control device at least temporarily to a lower actuating pressure. By the adjusted, lower base pressure, the hydraulic control device, and hence the dual-clutch transmission can be operated in a more energy efficient fashion. For example, the power consumption can be lowered at a correspondingly reduced base pressure of about 1300 mA.

The second object of the invention is achieved by a method comprising the method steps of adjusting by the base pressure control valve a hydraulic base pressure at the hydraulic control device; adjusting by suitable pressure control valves actuating pressures for actuating one or more transmission units; switching through one of the actuating pressures to the base pressure control valve; and adjusting the hydraulic base pressure by one of the actuating pressures. This method provides that the hydraulic base pressure of the dual clutch transmission is adjusted by one of the actuating pressures. Advantageously, this allows for a quick adjustment, in particular a reduction, of the hydraulic base pressure, significantly reducing the energy needed for providing the operating pressure. Preferably, the base pressure is adjusted exclusively based on the actuating pressures, in particular by the base pressure control valve.

According to the invention the base pressure control valve is controlled by one of the actuating pressures. This allows adjusting the hydraulic base pressure of the hydraulic control device dependent on a temporarily required actuating pressure.

The hydraulic base pressure can be adjusted also particularly quickly and reliably when an actuating pressure-dependent control signal by that the base pressure control valve can be controlled is determined on the output side of one of the pressure control valves for setting an actuating pressure.

A first advantageous embodiment of the present hydraulic control device provides that the control unit comprises a hydraulic pilot control device for the base pressure control valve. This can particularly simplify the design by dispensing with a previously required pilot valve.

For providing a variety of different actuating pressures and/or volume flow rates at the hydraulic control device, it is advantageous if the control unit includes a corresponding number of pressure reducing valves. Thus, for actuating a first clutch, a first actuating pressure can be provided, and for actuating a second clutch, a second actuating pressure that differs from the first actuating pressure can be provided.

For example, the control unit advantageously has a first pressure control valve and at least one further pressure control valve, wherein the first pressure control valve controls an actuating pressure for the first clutch and the further pressure control valve controls either a further actuating pressure for the second clutch or an actuating pressure for the switching system.

In this connection, the pressure control valves for adjusting the respective actuating pressures may preferably also function as pilot control valve for controlling the base pressure control valve dependent on an actuating pressure. This allows for a further reduction of the complexity of the design.

The device for controlling the base pressure valve dependent on an actuating pressure may have various designs. For example, data determined for a respective actuating pressure may be transmitted to the base pressure control valve electronically for controlling the base pressure control valve based on these data so that the base pressure is adjusted to the temporarily required actuating pressure within the hydraulic control device.

A structurally particularly favorable embodiment may comprise a device for switching through a hydraulic actuating pressure to the base pressure control valve, allowing to adjust the hydraulic base pressure of the hydraulic control device dependent on an actuating pressure. If the present control apparatus is provided with such a device for switching through the hydraulic actuating pressure to the base pressure valve, the structural complexity of the hydraulic control apparatus can be advantageously reduced further since the relevant actuating pressure can act directly on the base pressure control valve. In a structurally very simple embodiment, the device for switching through hydraulic pressure can be designed as a component or as a group of component parts of the device for controlling the base pressure control valve based on an actuating pressure.

A preferred embodiment provides that the hydraulic control apparatus comprises means for determining a highest temporarily required actuating pressure to the two clutches and/or at the switching system. In order to always ensure a proper function of the dual clutch transmission, it is advantageous if the highest temporarily required actuating pressure can be determined. Also, this device for determining a highest temporarily required actuating pressure can advantageously be designed as a component or as a group of component parts of the device for controlling the base pressure control valve based on an actuating pressure.

For performing the control method, it is technically advantageous if the hydraulic base pressure is determined by the highest temporarily required actuating pressure.

Ideally, the device for hydraulically switching through and the device for determining a maximum actuating pressure that is required temporarily are provided by the same components or component groups, allowing to further reduce the complexity of the design.

If the device for controlling the base pressure control valve based on an actuating pressure includes several devices for determining a highest one of the temporarily required actuating pressures, it can advantageously be achieved to provide a high number of variations of interconnection options of the hydraulically acting or working components of a transmission with the hydraulic control device. A first selection of related embodiments is discussed below in the detailed description of the drawings.

In order to achieve a comprehensive reaching interconnection of hydraulically acting or working components in a structurally very simple fashion, it is advantageous when a plurality of devices are arranged in a cascade fashion for determining the highest temporarily required actuating pressure. In such a cascade arrangement or cascade control it is possible to interleave advantageously a plurality of hydraulic control loops. This applies also to the above-described devices for switching through an actuating pressure to the base pressure control valve.

It is understood that the described means for determining a highest temporarily required actuating pressure and/or the means for switching through such actuating pressure can be integrated in almost any manner within the hydraulic control device.

If such devices are, for example, with respect to the clutches of a dual clutch transmission hydraulically connected in parallel and in addition hydraulically connected between a switching system for shifting gears and the base pressure control valve, it is advantageous if a temporarily required actuating pressure for actuating the switching system is always higher than one of the two actuating pressures of the clutches so that a proper function of the two clutches can be guaranteed at any time. The meaning of the expression "hydraulically in parallel" means that for each one of the clutches a separate device is provided for determining the highest temporary pressure. Thus the influence of one clutch on another can be reduced.

It is understood that the device for controlling based on an actuating pressure can be designed in a variety of different ways. The device for controlling based on an actuating pressure can structurally be designed as simple and robust against failures if it has at least one shuttle valve, particularly a double-ball check valve. Preferably, for the shuttle valve, means are provided that provide that even in cases where a plurality of actuating pressures for two parts of the transmission become the same these two parts can always be safely hydraulically separated from each other.

Particularly, for incorporating a hydraulically operated device for an actuating pressure-dependent control for controlling the base pressure control valve in an advantageous fashion in the present hydraulic control device, it is particularly advantageous to provide means for hydraulically connecting the device for an actuating pressure-dependent control with the output-side hydraulic lines of the control unit as well as with the base pressure control valve.

If hydraulic apertures are arranged within a hydraulic line system of the hydraulic control device, it is specifically possible to provide variations of pressure and flow conditions within the hydraulic line system. The hydraulic aperture can be designed as fixed, non-adjustable components.

In order to increase the operational reliability of the hydraulic control device further, it is advantageous if between the clutches and the correlating pressure control valves provided upstream of the clutches in each case a switching valve is hydraulically interconnected. These switching valves allow, for example, providing for switching to emergency driving modes at the hydraulic control device and therefore to structurally enhance emergency driving conditions of the transmission by a simple design.

Between the switching system and in the related upstream pressure control valve advantageously a shut-off valve is interconnected. In a first position the shut off valve connects the pressure control valve hydraulically with the switching system, while in a second position the connection is interrupted or is shut off and the switching system is switched simultaneously to a depressurized state. This shut-off valve prevents that an undesired pressure can build up in the switching system, while said pressure control valve still may continue to build an actuating pressure. Similarly, a shut-off valve may also be provided between at least one clutch and the correlating upstream pressure control valve.

Additional advantages, objects and features of the present invention will be explained with reference to exemplary embodiments in the drawings. Components which are at least substantially identical in the individual figures with regard to their function might be denoted by the same reference numerals, and these components need not be denoted by reference numerals and explained in all figures.

DETAILED DESCRIPTION OF THE DRAWINGS

Figure 1:
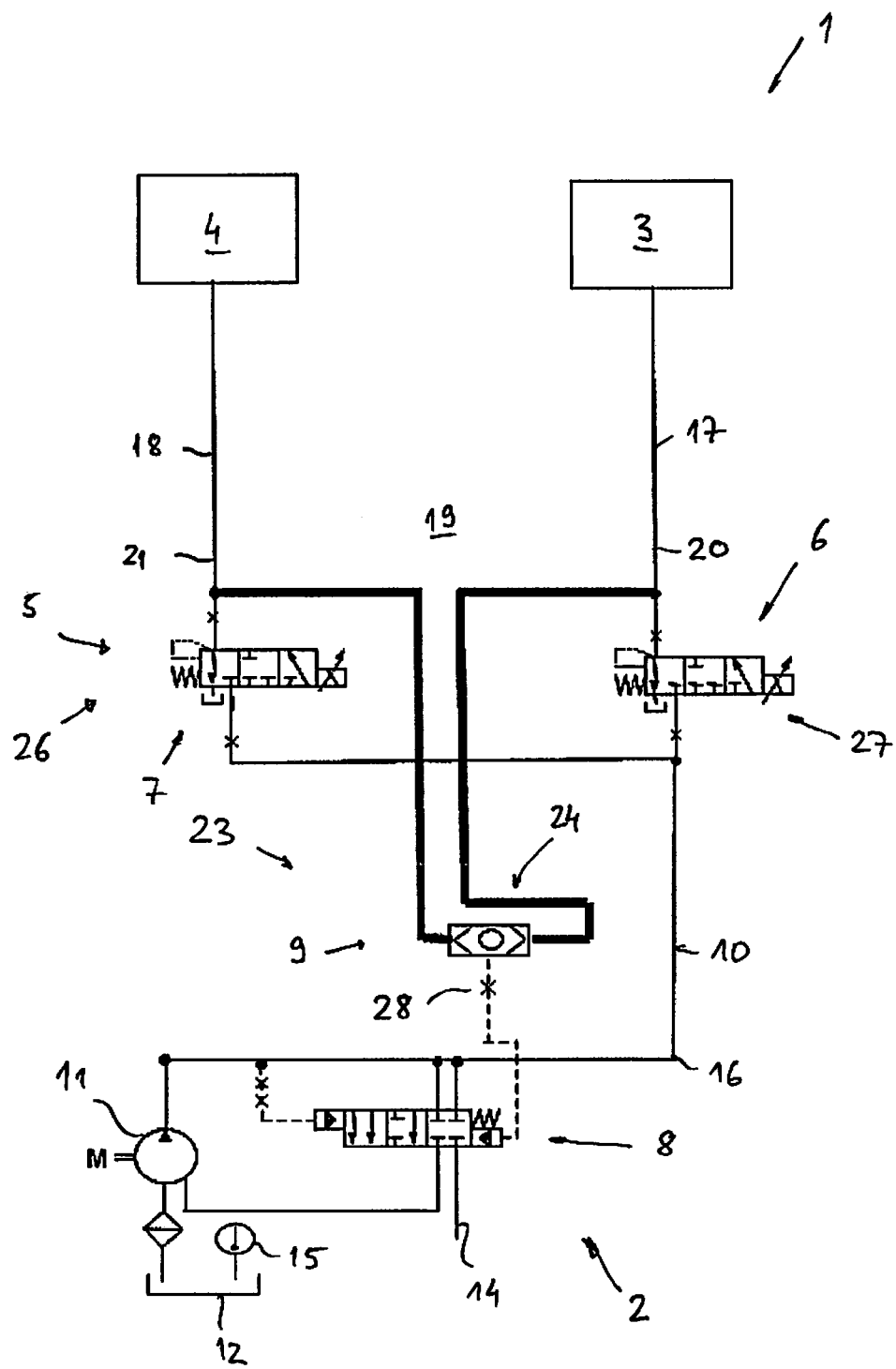
FIG. 1 schematically shows a first embodiment of the invention.

FIGS. 1-5 each show partially and schematically illustrated a dual clutch transmission with a hydraulic control device 2 and a first clutch 3 and a second clutch 4. By means of the two clutches 3 and 4, respective partial transmissions can be coupled to or uncoupled from the drive train (not shown) of the dual clutch transmission in a known fashion. The first embodiment of FIG. 1 is designated by reference numeral 1.

The hydraulic control device 2 comprises a control unit 5 with a first pressure control valve 6 and a second pressure control valve 7, a base pressure control valve 8, a device 9 for controlling the base pressure control valve 8 dependent on an actuating pressure, and a hydraulic line system 10 by means of which the aforementioned components of the hydraulic control device 2 can interact hydraulically with each other.

The hydraulic control device 2 is supplied with hydraulic oil by means of a hydraulic oil pump 11 from a reservoir 12, wherein between the hydraulic oil pump 11 and the reservoir 12, a hydraulic oil filter 13 is arranged. For monitoring the hydraulic oil temperature a temperature control device 15 is provided.

Particularly by means of the hydraulic oil pump 11, the hydraulic line system 10 and the base pressure control valve 8 can be provided with a base pressure 16 at the hydraulic control device 2. The base pressure 16 can then be controlled for the purpose of actuating the clutches 3 and 4 by means of pressure control valves 6 and 7 properly to create the actuating pressures 17 or 18 at the output side 19 of pressure control valves 6 and 7, respectively. The pressure control valves 6, 7 are designed as 3/3-way valves in this embodiment. The base pressure 16 is always a little higher than the required actuating pressures 17, 18 for compensating for pressure losses occurring in the hydraulic control device 2.

For the purpose of avoiding that the hydraulic control device 2 is always supplied with a maximum base pressure 16 even if under many operating conditions of the dual clutch transmission such a maximum pressure is generally not required, the base pressure control valve 8 is controlled depending on the actuating pressure. This allows reducing the base pressure 16 as required, for example if only a low actuating pressure is needed. Therefore, the dual clutch transmission can operate at higher energy efficiency.

For this purpose, device 9 for controlling the base pressure control valve 8 dependent on an actuating pressure is hydraulically connected to output-side hydraulic lines 20 or 21 of the two pressure control valves 6 or 7. On the other hand, the device 9 for controlling the base pressure control valve dependent on an actuating pressure is hydraulically connected at a spring side 22 of the base pressure control valve 8 so that the pressure conditions at the actuating pressures 17 and 18, respectively, can be directly switched through to the base pressure control valve 8.

Structurally, this allows providing the device 9 for controlling the base pressure control valve dependent on an actuating pressure with relatively simple structure by a device 23 that simply switches the actuating pressures 17, 18 through to the base pressure control valve 8.

Via a cooling line 14 cooling oil can be provided to the clutches 3, 4 for the purpose of cooling. The base pressure control valve 8 is designed so that the discharge of the cooling oil does not burden providing a high actuating pressure when such a high actuating pressure is required.

For the purpose of adjusting the base pressure 16 at any time to the highest temporarily necessary actuating pressures 17 and 18, it is advantageous if the device 9 for controlling the base pressure control valve dependent on an actuating pressure comprises a device 24 for determining the highest temporarily required actuating pressures 17 and 18, respectively, as required by the two clutches 3 and 4.

According to an embodiment, the device 9 for controlling the base pressure based on an actuating pressure can be structurally very simple such as a double-ball check valve 25 so that the highest temporarily required actuating pressure 17 or 18 can at any time directly act on the base pressure control valve 8.

Advantageously, the control unit 5 provides a hydraulic pilot control device 26 for the base pressure control valve 8. To this extent, the pressure control valves 6, 7 function as pilot control valves 27 (only denoted in exemplary fashion) for the base pressure control valve 8.

In the entire hydraulic line system 10 of the hydraulic control device 2, additional hydraulic apertures 28 (only numbered in an exemplary fashion, but at other locations simply marked "x") are provided, allowing additionally to adjust pressures and volume flow rates within the hydraulic line system 10 and are capable of suppressing undesirable dynamic effects.

To ensure further emergency running capabilities of the dual clutch transmission, switching valves can be provided in a known but not shown fashion downstream of the control unit 5, but upstream of the two clutches are 3 or 4.

Figure 2:
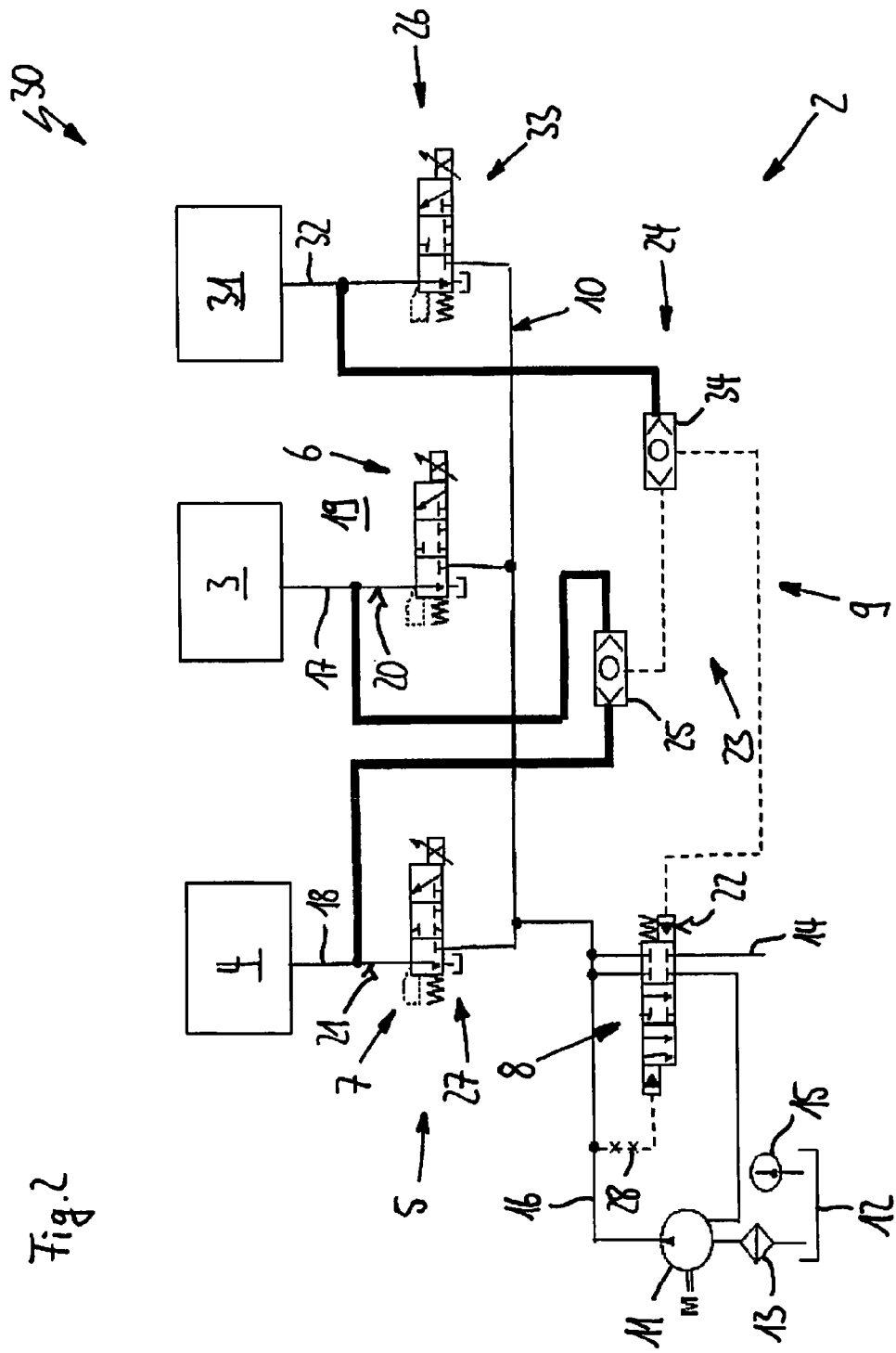
FIG. 2 shows schematically a second embodiment of the invention.
Figure 3:
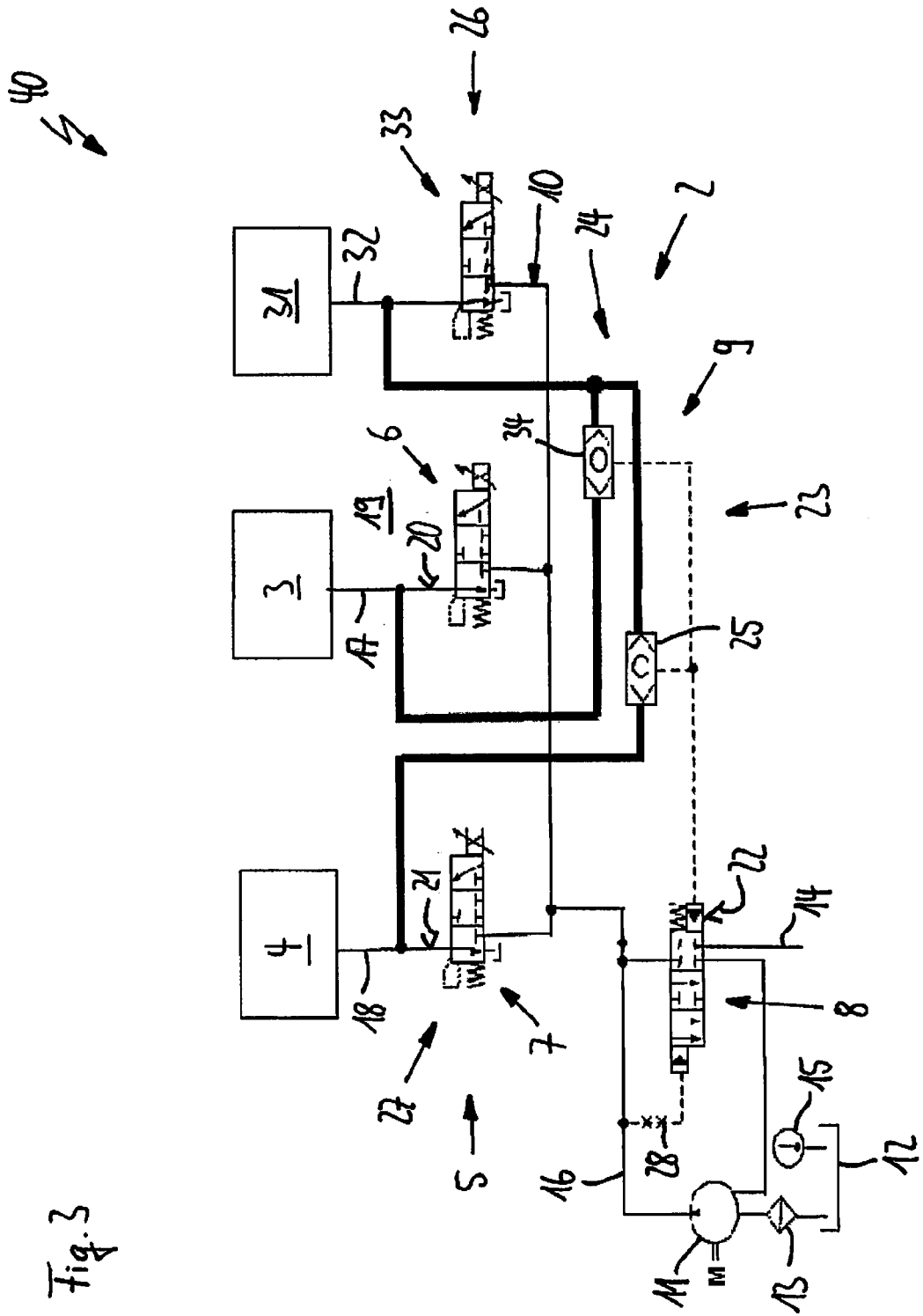
FIG. 3 schematically shows a third embodiment of the invention.

The second embodiment 30 shown FIG. 2 is likewise a hydraulic control device 2 for a dual clutch transmission, so that in the following only the differences to the first embodiment are described.

The hydraulic control device 2 of the second embodiment 30 comprises in addition to the two clutches 3 and 4 further a switching system 31 for shifting gears in the partial transmissions, not shown here, of the dual clutch transmission. For adjusting also a third actuating pressure 32 at the switching system 31, the control unit 5 of the hydraulic control device 2 comprises a third pressure control valve 33. Thus, the hydraulic control device 2 has a total of three pressure control valves 6, 7 and 33 that are each designed as 3/3-way valves and each represents a pilot control valve 27 for the base pressure control valve 8. Advantageously, an additional pilot valve (here not present) can be omitted in the present case that would be in connection with the base pressure control valve 8 since this function of a pilot valve is already provided by the three pressure control valves 6, 7 and 33.

The device 9 for controlling the base pressure control valve 8 dependent on an actuating pressure provided in this embodiment comprises in addition to the first double-ball check valve at 25 further a second double-ball-check valve 34, so that the base pressure control valve 8 can also be controlled with respect to the third actuating pressure 32 of the switching system 31. The two double-ball check valves 25 and 34 are in this case connected in a cascade fashion in series so that it has been structurally implemented in a extremely simple fashion to guarantee that the highest temporarily required actuating pressure 17, 18 or 32 can act on the base pressure control valve 8 and thus the hydraulic base pressure 16 can be adjusted accordingly. Here, by means of the first double-ball check valve 25, the two actuating pressures 17 and 18 of the pressure control valves 6 and 7 are directly compared with each other. The higher actuating pressure of the actuating pressures 17 and 18 is then compared by means of the second double-ball check valve 34 with the third actuating pressure 32 of the third pressure control valve 33. The higher actuating pressure in this last comparison then controls the base pressure control valve 8 and consequently the hydraulic base 16 of the hydraulic control device 2. The device 9 for controlling the base pressure control valve 8 dependent on an actuating pressure thus forms with the first double-ball-check valve 25 and the second double-ball check-valve 34 a cascade control device.

In contrast to this second embodiment 30, the two double-ball check valves 25 and 34 in the hydraulic control device 2 of the third embodiment 40 (see FIG. 3) are hydraulically connected in parallel to each other. This requires, however, that the third actuating pressure 32, for actuating the switching system, always needs to be set higher than the other two actuating pressures 17 and 18 for actuating the clutches 3 and 4. Otherwise, the two pressure control valves 6 and 7 are short-circuited, preventing an independent pressure control. Advantageously, the parallel connection prevents that the balls of these two double-ball check valves 25 and 34 unintentionally leave their seats. This may otherwise result in some minor pressure errors at the clutches 3 and 4. Additionally, according to the embodiment shown in FIG. 3, it can be prevented that volume flows, which are required for driving the base pressure control valve 8, may drain into the clutch pressure control loops of the respective pressure control valves 6 and 7. Also this might otherwise result in pressure errors at the clutches 3 and 4.

Except for the connection of the two double-ball check valves 25 and 34, the hydraulic control device 2 of the third embodiment 40 (FIG. 3) has the same structure as the hydraulic control device 2 of the second embodiment 30 (FIG. 2) so that a repeated description of this structure is be omitted.

Figure 4:
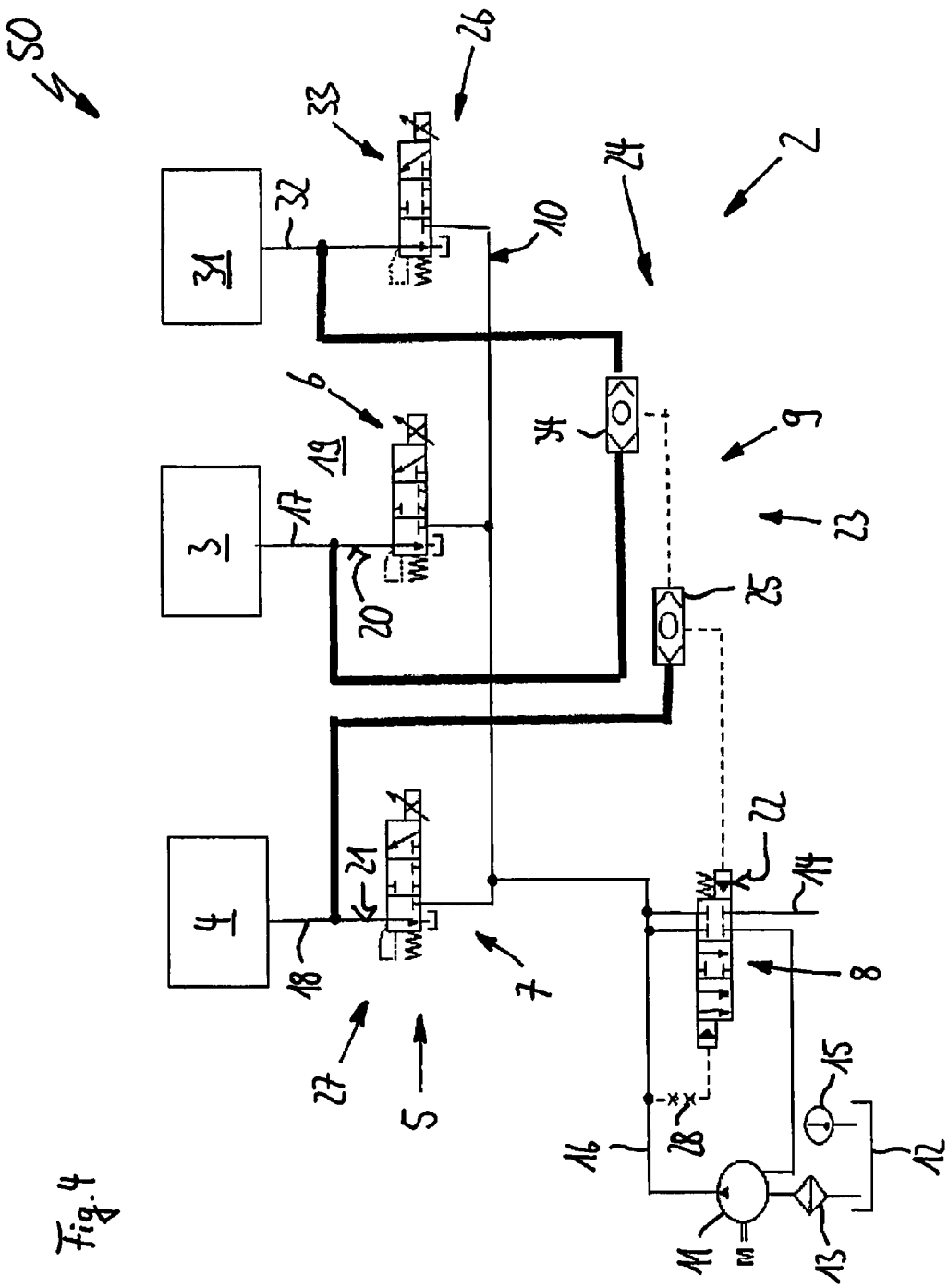
FIG. 4 schematically shows a fourth embodiment of the invention.

In the fourth embodiment 50 shown in FIG. 4 the device 9 for controlling the base pressure control valve 8 dependent on an actuating pressure is designed such that by means of the second double-ball check-valve 34 the first actuating pressure 17 correlating to the first clutch 3 and the third actuating pressure 32 can be directly compared in the switching system 31. The thus determined higher actuating pressure is then hydraulically switched through to the first double-ball check-valve 25 and there compared with the second actuating pressure 18 correlating to the second clutch 4, wherein the determined higher actuating pressure can hydraulically act on the base pressure control valve 8.

Therefore, the two double-ball check valves 25 and 34 are connected in series, but in this case, the two pressure control valves 6 and 33 connected on the output side 19 are directly interconnected with each other by the second double-ball check-valve 34. This allows combining the advantages of the third embodiment 40 with the additional possibility of an independent pressure control of the two pressure control valves 6 and 7 even when the actuating pressure 32 of the pressure control valve 33 is lower than the actuating pressures 17 and 18 at the two pressure control valves 6 and 7. Thus, the hydraulic control device 2 according to the fourth embodiment 50 (FIG. 4) is a particularly preferred alternative when the three pressure control valves are 6, 7 and 33 are used.

Figure 5:
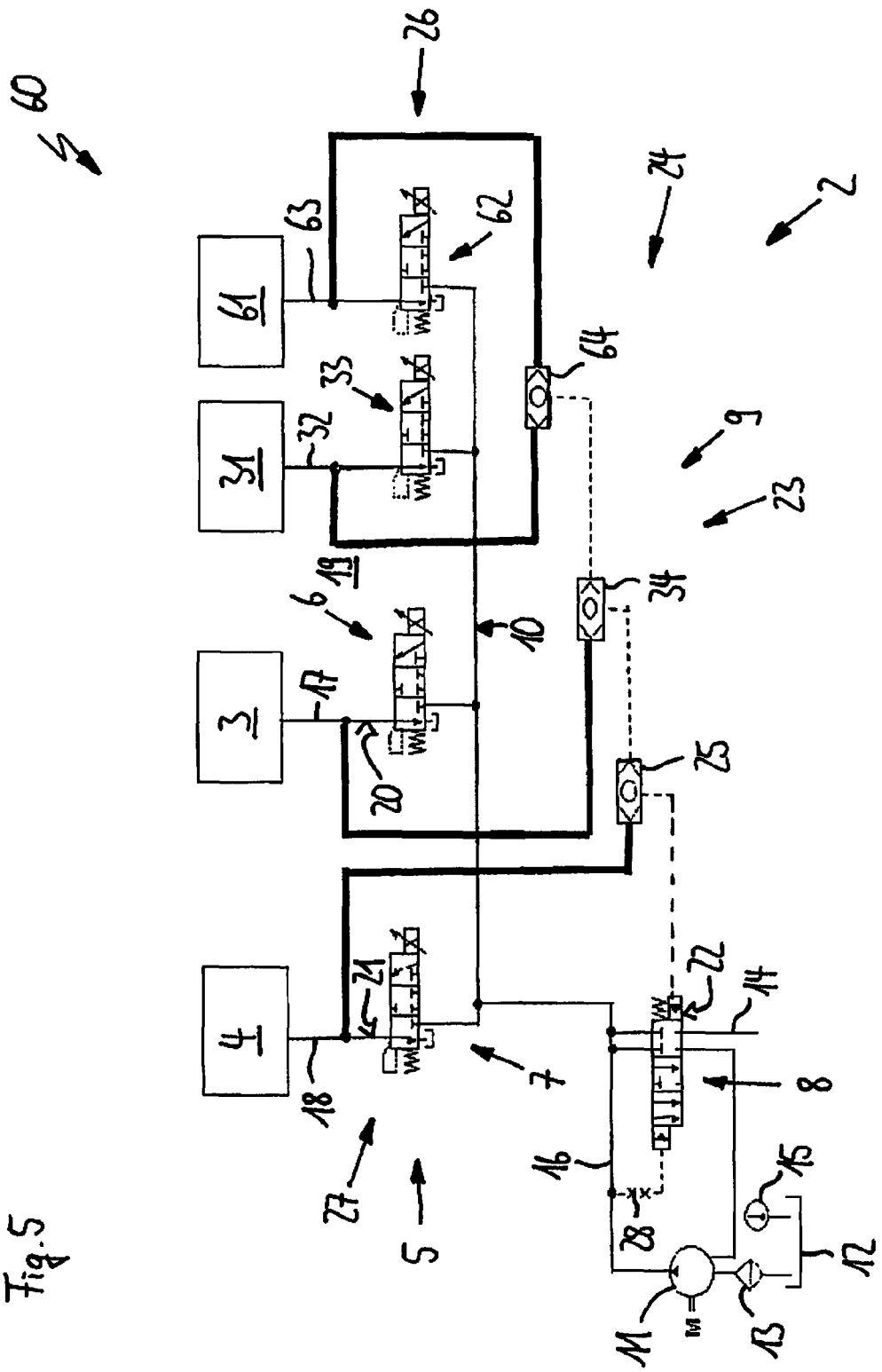
FIG. 5 schematically shows a fifth embodiment of the invention.

In the fifth embodiment 60 according to FIG. 5, the hydraulic control device 2 comprises in addition to the switching system 31 a further switching system 61 and a fourth pressure control valve 62 is connected to the further switching system 61 at its upstream side. By means of the fourth pressure control valve 62, a fourth actuating pressure 63 can be adjusted. At their output side 19, the two pressure control valves 33 and 62 are hydraulically interconnected by means of a third double-ball check-valve 64. Therefore, the two predetermined actuating pressures 32 and 63 are compared with each other by means of the third double-ball check-valve 64 by means of the double-ball check-valve 34, wherein the higher actuating pressure at the second double-ball check-valve 62 is switched through hydraulically and there compared with the first actuating pressure 17 of the first pressure control valve 6. The higher actuating pressure determined from this comparison is switched hydraulically through to the first double-ball check-valve 25 and is there compared with the second actuating pressure 18 of the second pressure control valve 7. The higher actuating pressure determined by this latter comparison controls the base pressure control valve 8 and therefore the hydraulic base pressure 16.

The device 9 for controlling the base pressure control valve 8 dependent on an actuating pressure has therefore a total of three double-ball check valves 25, 34 and 64 which are connected in a cascade fashion with each other. This results in, inter alia, the advantages of the fourth embodiment 50 with the additional advantage of allowing the use of a fourth pressure control valve 62.

The cascade of double-ball check valves 25, 34 and 64, as shown in FIG. 5, can also be designed differently. For example, the valve 64 can be used for comparing the actuating pressures 63 and 17, while the valve 34 can be used for comparing the actuating pressures 18 and 32. The valves 64 and 34 then may be coupled via the valve 25. This demonstrates that the four actuating pressures 17, 18, 32, 63 can be compared in any fashion with each other via the valves 25, 34, 64 connected in a cascade arrangement.

Figure 6:
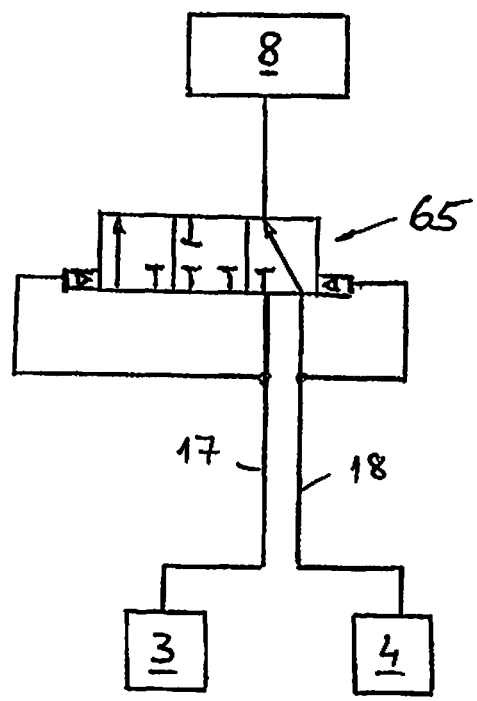
FIG. 6 schematically shows an exemplary embodiment of a shuttle valve.

In FIGS. 1 through 5, the double ball check valves 25, 34 and 64 are shuttle valves, which may suffer at the same actuating pressures from not being separated hydraulically from each other, for example when the clutches 3, 4 (see FIG. 1) are subjected to the same actuating pressures. FIG. 6 schematically shows a further embodiment 65 for a shuttle valve, which assumes a central switching position when the actuating pressures 17, 18 of the clutches 3, 4 are equal. In this central switching position, the clutches 3, 4 are safely separated from each other. In the switching position shown in FIG. 6 the actuating pressure 17 is higher than the actuating pressure 18 so that the higher actuating pressure is switched through 17 to the base pressure valve 8.

LIST OF REFERENCE NUMERALS 1 first embodiment
2 hydraulic control device
3 first clutch
4 second clutch
5 control unit
6 first pressure control valve
7 second pressure control valve
8 base pressure control valve
9 device for controlling dependent on an actuating pressure.
10 hydraulic line system
11 hydraulic oil pump
12 reservoir
13 hydraulic oil filter
14 cooling line
15 temperature control device
16 base pressure
17 first actuating pressure
18 second actuating pressure
19 on the output side
20 first output-side hydraulic line
21 second output-side hydraulic line
22 spring side
23 device for switching through an actuating pressure
24 device for determining a highest actuating pressure
25 first double-ball check valve
26 hydraulic pilot control device
27 pilot control valve
28 hydraulic aperture
30 second embodiment
31 switching system
32 third actuating pressure
33 third pressure control valve
34 second double-ball check valve
40 third embodiment
50 fourth embodiment
60 fifth embodiment
61 further switching system
62 fourth pressure control valve
63 fourth actuating pressure
64 third double-ball check valve
65 shuttle valve

The invention claimed is:

1. An automated transmission comprising;
a hydraulic control device;
one or more hydraulically actuated gear units; and
at least one pressure control valve connected to an output-side hydraulic line providing an actuating pressure to the one or more hydraulically actuated gear units;
wherein
the hydraulic control device comprises:
a control unit for setting actuating pressures on the gear units;
a base pressure control valve for adjusting a hydraulic base pressure of the hydraulic control device; and
a base pressure control device designed to control the base pressure control valve dependent on the actuating pressures;
wherein
the automated transmission further comprises a device hydraulically connecting the base pressure control valve directly to the output-side hydraulic line such that the highest temporarily required actuating pressure can at any time directly act on the base pressure control valve; and
the base pressure control device is configured to reduce the base pressure at least temporarily and therefore reduce the actuating pressure.

2. The transmission according to claim 1, wherein the transmission is designed as a dual clutch transmission comprising as hydraulically actuated gear units a first clutch for connecting and disconnecting a first partial transmission to or from a powertrain, a second clutch for connecting and disconnecting a second partial transmission to or from the powertrain, and a switching system for shifting gears in the first and second partial transmission.

3. The transmission of claim 1, further comprising a device for determining a highest temporarily required actuating pressure at least at one of the transmission units, the two clutches and the switching system.

4. The transmission of claim 1, wherein the base pressure control device dependent on the actuating pressures comprises a plurality of base pressure control devices for determining a highest temporarily required one of the actuating pressures.

5. The transmission of claim 1, wherein a plurality of base pressure control devices for determining a highest temporarily required actuating pressure are connected in a cascade fashion in series.

6. The transmission of claim 1, wherein the base pressure control device is adapted to adjust the hydraulic base pressure to be by an amount delta higher than a highest temporarily required actuating pressure.

7. The transmission of claim 1, wherein the base pressure control device comprises at least one shuttle valve that is a double-ball check-valve.

8. The transmission of claim 7, wherein the double-ball check-valve is designed to separate the transmission units hydraulically from each other at any of the actuating pressures.

9. The transmission of claim 1, wherein the control unit comprises a hydraulic pilot control device for the base pressure control valve.

10. The transmission of claim 2, wherein the control unit comprises a first pressure control valve and at least one further pressure control valve, wherein by the first pressure control valve the actuating pressure for the first clutch is adjustable and by the further pressure control valve the further actuating pressure for the second clutch or for the switching system is adjustable.

11. The transmission of claim 10, wherein the pressure control valves for adjusting the respective actuating pressures each have a pilot valve for controlling the base pressure control valve dependent on the actuating pressures.

12. The transmission of claim 1, further comprising a device for hydraulically connecting said base pressure control device both with output-side hydraulic lines of the control unit and with the base pressure control valve.

13. The transmission of claim 1, wherein hydraulic apertures are provided within a hydraulic line system of the hydraulic control device.

14. The transmission of claim 2, wherein a temporarily required actuating pressure for actuating the switching system is always higher than one of the first actuating pressure of the first clutch and the second actuating pressure of the second clutch.

15. A method for operating an automated transmission comprising: a hydraulic control device; one or more hydraulically actuated gear units, and at least one pressure control valve connected to an output-side hydraulic line providing an actuating pressure to the one or more hydraulically actuated gear units; wherein the hydraulic control device comprises: a control unit for setting actuating pressures on the gear units; a base pressure control valve for adjusting a hydraulic base pressure of the hydraulic control device; and a base pressure control device designed to control the base pressure control valve dependent on the actuating pressures; and wherein the automated transmission further comprises a device hydraulically connecting the base pressure control valve directly to the output-side hydraulic line such that the highest temporarily required actuating pressure can at any time directly act on the base pressure control valve; and the base pressure control device is configured to reduce the base pressure at least temporarily and therefore reduce the actuating pressure; said method comprising:

adjusting by the base pressure control valve a hydraulic base pressure at the hydraulic control device;

adjusting by suitable pressure control valves actuating pressures for actuating one or more transmission units;

adjusting the hydraulic base pressure by one of the actuating pressures;

reducing the base pressure at least temporarily to a lower actuating pressure; and directly switching through the actuating pressures to the base pressure control valve so that the highest temporarily required actuating pressure can at any time directly act on the base pressure control valve.

16. The method of claim 15, further comprising adjusting the hydraulic base pressure by the highest temporarily required actuating pressure.

17. The method of claim 15, further comprising controlling the base pressure control valve by one of the actuating pressures.

18. The method of claim 15, further comprising generating an actuating pressure-dependent control signal for controlling the base pressure control valve, said control signal representing a pressure at the output side of one of the pressure control valves that are adjusting the actuating pressures.

* * * * *